Nov. 10, 1970 A. S. FEDOROV 3,540,017

PULSE TRANSFORMER DRIVEN MEMORY MATRIX

Filed July 12, 1967 2 Sheets-Sheet 1

Nov. 10, 1970 A. S. FEDOROV 3,540,017

PULSE TRANSFORMER DRIVEN MEMORY MATRIX

Filed July 12, 1967 2 Sheets-Sheet 2

United States Patent Office 3,540,017
Patented Nov. 10, 1970

3,540,017

PULSE TRANSFORMER DRIVEN MEMORY MATRIX

Alexei Sergeevich Fedorov, 1 Ulitsa Izmalovskogo zverintsa 7, kv. 1, Moscow, U.S.S.R.
Filed July 12, 1967, Ser. No. 652,882
Int. Cl. G11c *5/02, 11/06, 7/02*
U.S. Cl. 340—174 2 Claims

ABSTRACT OF THE DISCLOSURE

A memory unit comprises a matrix of a plurality of memory elements, the number of memory elements being equal to the number of digits the matrix can memorize, the matrix consisting of columns and rows of magnetic elements. Each of the magnetic elements along the columns and rows is coupled with two orthogonal busbars arranged to feed the magnetic elements with partial switching currents, the magnetic elements being located only at cross points of even columns and even rows and of odd columns and odd rows. A pulse transformer is associated with an individual one of the columns of the matrix, each transformer having first, second and third windings. The first winding of each transformer is connected to the busbar which is coupled to the memory elements of the associated column of the matrix, the transformer being divided into pairs, each pair corresponding to an odd and an even column which are adjacent, the second windings of each pair of transformers being connected together, the third windings of each pair of transformers being connected in opposition and all the third windings being connected in series to form a reading winding.

The present invention relates to magnetic memory units of computers and automatic instruments employing any magnetic elements with rectangular hysteresis loop, particularly ferrite cores, wherefrom the information is read out by simultaneous excitation of busbars coupled with memory elements according to two coordinates X and Y.

There are known circuits of memory units employing the said principle of operation (cf. I. R. Raichman, "Amyriabit Magnetic Core Memory," Proc. IRE, vol. 41, October 1953).

The known circuits of the memory units based on simultaneous excitation of two busbars according to coordinates X and Y during readout employ reading windings coupled with all magnetic elements of one binary digit of a memory unit.

The disadvantage of the said circuits is the intricacy in the manufacture of the matrices of memory elements, inconvenience in manufacturing the reading windings which hinders manufacture of matrices on automatic machines intended for wiring the windings coupled with magnetic elements.

An object of the present invention is to eliminate the aforementioned disadvantages and to provide a memory unit based on the principle of simultaneous excitation of two busbars X and Y during readout from magnetic elements and not provided with a reading winding coupled with all memory elements of the same digit that makes it possible to simplify the wiring circuit of the matrices of high capacitance memory units and substantially reduce labor consumption.

The said object is achieved, according to the invention, in a memory unit containing matrices of magnetic elements and, in particular, of ferrite cores wired by busbars X and Y and pulse transformers, each of which is provided with an exciting winding and output winding coupled with busbars X and Y wherein, according to the invention, each pulse transformer coupled with the busbar Y is provided with an auxiliary output winding connected in parallel with the windings of all pulse transformers coupled with the busbars Y and relating to the same digit of a memory unit and connected in opposition for each pair of pulse transformers relating to the same digit and provided with a common exciting winding, and additionally, the said auxiliary windings of the pulse transformers form a reading winding of the same digit.

Hereinbelow the invention is described with reference to an embodiment of the memory unit circuit illustrated in the drawings attached hereto, wherein.

Figure 1:
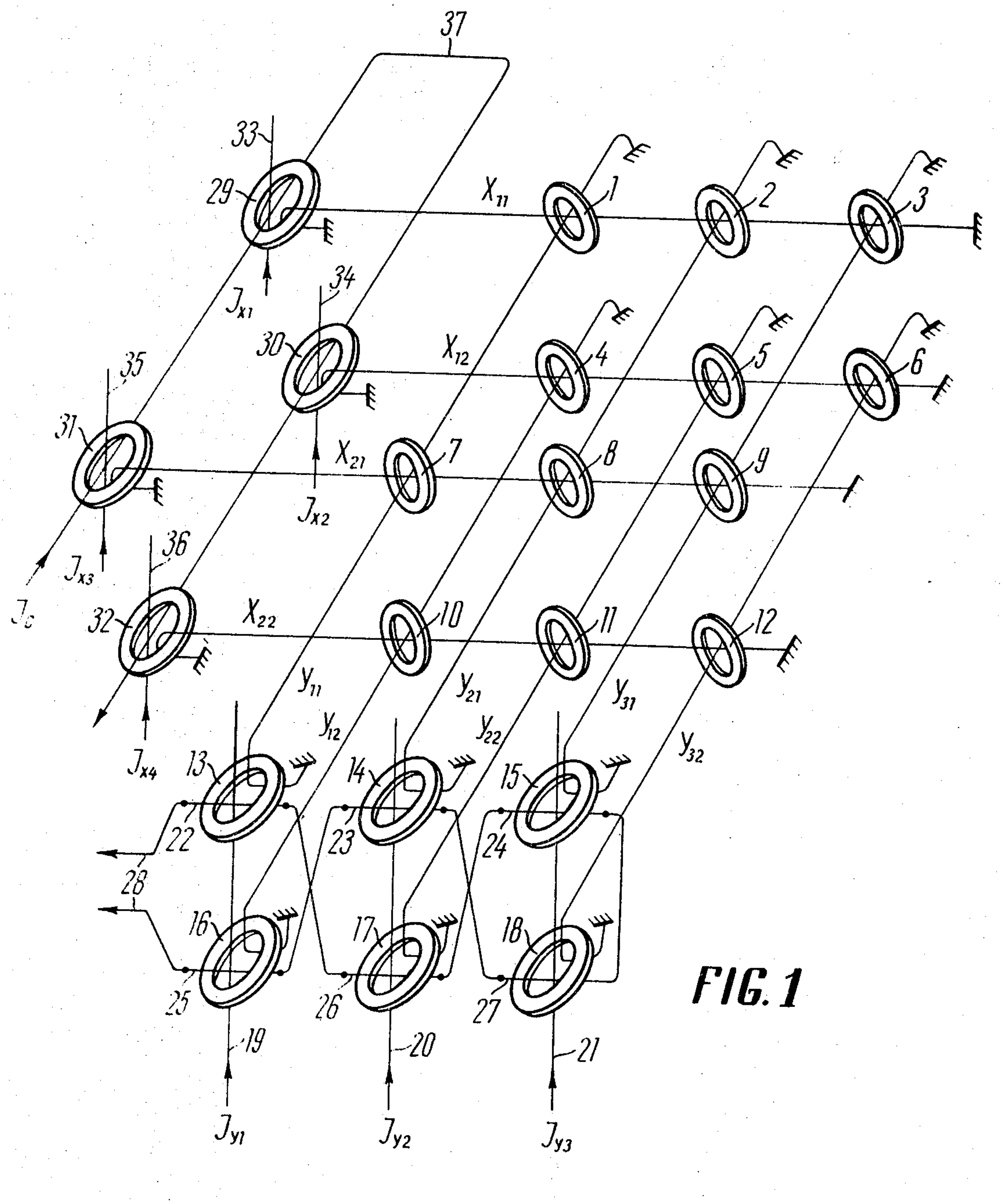
FIG. 1 illustrates a memory unit single digit circuit (for simplicity the number of memory elements is taken equal to 12)

The memory unit according to the invention comprises a matrix of memory elements 1 through 12 with a rectangular hysteresis loop wired by busbars $X_{11}$, $X_{12}$, $X_{21}$, $X_{22}$ and $Y_{11}$, $Y_{12}$, $Y_{21}$, $Y_{22}$, $Y_{31}$, $Y_{31}$ in two conductivity directions, and pulse transformers 13 through 18 wherein use is made of a material with a linear magnetic characteristic having excitation windings 19, 20 and 21 which are connected in series for the pulse transformers of all digits of the memory unit coupled with pairs of busbars $Y_{11}$ and $Y_{12}$, $Y_{21}$ and $Y_{22}$, $Y_{31}$ and $Y_{31}$. The pulse transformers 13 through 18 are provided with auxiliary output windings 22 through 27 connected in series for all pulse transformers 13 through 18 and connected in opposition for each pair of pulse transformers 13 and 16, 14 and 17, 15 and 18 additionally, the said auxiliary output windings 22 through 27 form a winding 28 for reading out one digit. The memory unit further comprises pulse transformers 29 through 32 made of a material with a rectangular hysteresis loop and connected with their output windings to busbars $X_{11}$, $X_{12}$, $X_{21}$, $X_{22}$; the pulse transformers 29 through 32 are provided with excitation windings 33 through 36 connected in series for the transformers of all digits of the memory unit coupled with busbars $X_{11}$, $X_{12}$, $X_{21}$, $X_{22}$, and a common displacement winding 37 for the said transformers relating to the same digit.

The memory unit can be made without the transformers 29 through 32 with a rectangular hysteresis loop. In this case, use should be made of semi-conductor switching elements.

The memory unit operates as follows.

The memory unit can operate in two modes: "reading" and "recording," "reading" always preceding "recording."

Figure 2:
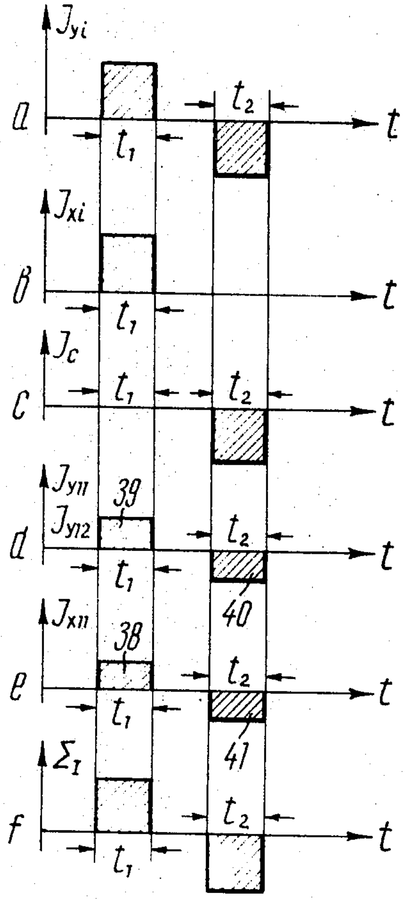
FIG. 2 shows a time diagram of the unit operation during "reading" and "recording" of code "1"
Figure 3:
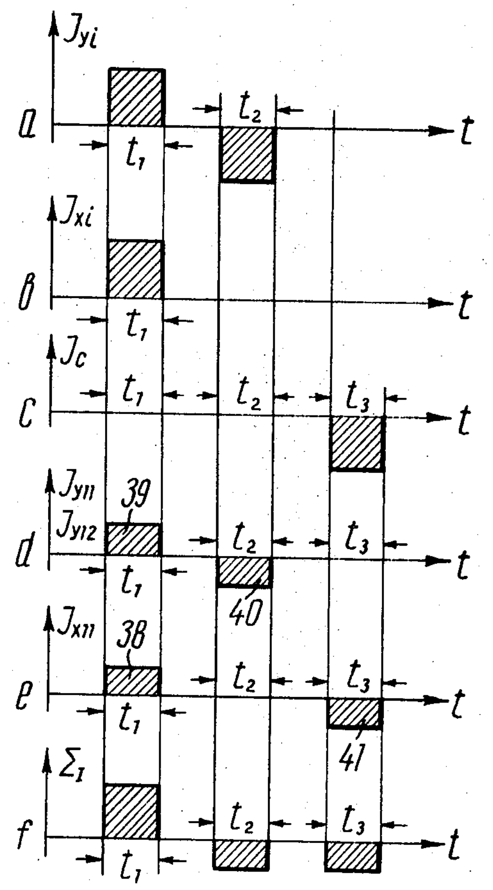
FIG. 3 shows a time diagram of the unit operation during "reading" and "recording" of code "0."

The memory unit operating in the "reading" mode, simultaneously at the moment of time $t_1$ (FIG. 2*a*) in compliance with the indicated location a current pulse $I_{yi}$ ($i$=1, 2, 3) is delivered to one of the exciting busbars of the transformers 19, 20 or 21 (FIG. 1) and a current pulse $I_{x1}$, $I_{x2}$, $I_{x3}$, or $I_{x4}$ (pulse $I_{xi}$, FIG. 2*b*)—to one of the exciting busbars of the pulse transformers 33, 34, 35 or 36 (FIG. 1). Thereat, one of the transformers 29, 30, 31 or 32 with a rectangular hysteresis loop is switched over and a current pulse 38 (FIG. 2*e*) is generated in one of the busbars $X_{11}$, $X_{12}$, $X_{21}$ or $X_{22}$, for example, in $X_{11}$ (FIG. 1). Simultaneously generated is a current pulse 39 (FIG. 2*d*) in the busbar pairs $Y_{11}$ and $Y_{12}$, $Y_{21}$ and $Y_{22}$ or $Y_{31}$ and $Y_{32}$, for example, in $Y_{11}$ and $Y_{12}$ (FIG. 1). The intensity of exciting current pulses 38 and 39 makes no room for a single pulse to switch over a memory element with a rectangular hysteresis loop. The selected memory element is under the simultaneous effect of exciting current pulses 38 and 39 (pulse $E_I$, FIG. 2*f*) and will be switched over. If the selected magnetic element, prior to reading, is under the magnetic state of code "1," it will be switched over into the magnetic state of code "0." In this case, generated in the digit reading winding 28 (FIG. 1) is a pulse of the voltage $U_1$ caused by over-magnetizing of the memory element. Generated simultaneously with a reading signal $U_1$ across the digit reading winding 28 will be a difference in voltages from those matrix memory elements which are excited by the current pulses 38 or 39 according to coordinates X and Y. Since the digit reading winding 28 is wired in each pair of the pulse transformers 13 and 16, 14 and 17 or 15 and 18 in the counterphase, the signals coming from the said memory elements will be found compensated. If the memory element, prior to reading, has been in the state of code "0" it will not change its magnetic state.

During "recording" operation two cases are possible viz.: recording of code "1" and recording of code "0."

During recording of code "1" to one of the exciting busbars 19, 20 or 21 at the moment of time $t_2$ (FIG. 2*a*) current pulse $I_{yi}$ ($i$=1, 2, 3) which has a polarity opposite to that of the pulse $I_{yi}$ at the moment of time $t_1$ is delivered. Simultaneously, to displacement winding 37 (FIG. 1) a current pulse $I_c$ (FIG. 2*c*) is delivered which returns pulse transformer with a rectangular hysteresis loop to initial magnetic state.

In this case, in one of the busbars $X_{11}$, $X_{12}$, $X_{21}$ or $X_{22}$ (FIG. 1), as well as in the busbar pairs $Y_{11}$ and $Y_{12}$, $Y_{21}$ and $Y_{22}$ or $Y_{31}$ and $Y_{32}$ there will be generated current pulses 40 and 41 (FIGS. 2*d* and 2*e*), which, being under simultaneous effect, will record code "I" on the selected memory element.

Prior to recording code "0" on the memory element it is necessary to carry out the "reading" operation after which code "0" will be found in the memory element. The "reading" operation proceeds at the moment of time $t_1$ (FIGS. 3*a*, 3*b*, 3*d*, 3*e* and 3*f*) in a way similar to that described above.

During recording of code "0" delivered at the interval of time $t_2$ (FIG. 3*a*) is current pulse $I_{yi}$ ($i$=1, 2, 3) which has a polarity opposite to that of the pulse $I_{yi}$ at the moment of time $t_1$, while delivered at the moment of time $t_3$ (FIG. 3*c*) into the displacement discharge winding 37 (FIG. 1) is a current pulse $I_c$. In this case, no summarization of currents in the selected memory element will occur (FIG. 3*f*), and the latter will remain under the state of code "0."

We claim:

1. A memory unit comprising a matrix of a plurality of memory elements, the number of memory elements being equal to the number of digits the matrix can memorize, the matrix consisting of columns and rows of magnetic elements, two orthogonal busbars coupled to each of said elements along the columns and rows to feed partial switching currents to the magnetic elements, the magnetic elements being located only at cross points of even columns and even rows and of odd columns and odd rows; and a plurality of pulse transformers each of which is associated with an individual one of the columns of the matrix, each transformer including first, second and third windings, the first winding of each transformer being connected to the busbar which is coupled to the memory elements of the associated of the matrix, the transformers being divided into pairs, each pair corresponding to an odd and an even column which are adjacent, the second windings of each pair of transformers being connected together, the third windings of each pair of transformers being connected in opposition and all the third windings being connected in series to form a reading winding.

2. A memory unit as claimed in claim 1 which comprises more than one matrix of memory elements, each matrix being provided with its individual busbars and pulse transformers.

References Cited

UNITED STATES PATENTS

| | | | |
|---|---|---|---|
| 2,776,419 | 1/1957 | Rajchman et al. | 340—174 |
| 3,404,387 | 12/1968 | Amemiya | 340—174 |

JAMES W. MOFFITT, Primary Examiner

S. B. POKOTILOW, Assistant Examiner

U.S. Cl. X.R.

307—88